United States Patent
Subramanya et al.

(10) Patent No.: US 9,224,103 B1
(45) Date of Patent: Dec. 29, 2015

(54) AUTOMATIC ANNOTATION FOR TRAINING AND EVALUATION OF SEMANTIC ANALYSIS ENGINES

(71) Applicant: Google Inc., Mountain View, CA (US)

(72) Inventors: Amarnag Subramanya, Sunnyvale, CA (US); Fernando Pereira, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 262 days.

(21) Appl. No.: 13/801,197

(22) Filed: Mar. 13, 2013

(51) Int. Cl.
*G06F 15/18* (2006.01)
*G06N 99/00* (2010.01)

(52) U.S. Cl.
CPC .................... *G06N 99/005* (2013.01)

(58) Field of Classification Search
None
See application file for complete search history.

(56) References Cited

U.S. PATENT DOCUMENTS

| | | | |
|---|---|---|---|
| 7,502,770 B2 | 3/2009 | Hillis et al. | |
| 7,587,387 B2 | 9/2009 | Hogue | |
| 7,765,206 B2 | 7/2010 | Hillis et al. | |
| 7,769,579 B2 | 8/2010 | Zhao et al. | |
| 7,774,328 B2 | 8/2010 | Hogue et al. | |
| 7,792,837 B1 | 9/2010 | Zhao | |
| 7,925,610 B2 | 4/2011 | Elbaz et al. | |
| 8,051,104 B2 | 11/2011 | Weissman et al. | |
| 8,122,026 B1 | 2/2012 | Laroco et al. | |
| 8,204,856 B2 | 6/2012 | Meyer et al. | |
| 8,370,128 B2 | 2/2013 | Brun et al. | |
| 8,898,159 B2 * | 11/2014 | Brown et al. | 707/730 |
| 2005/0278325 A1 | 12/2005 | Mihalcea et al. | |
| 2008/0281764 A1 | 11/2008 | Baxter | |
| 2010/0121839 A1 | 5/2010 | Meyer et al. | |
| 2010/0145678 A1 * | 6/2010 | Csomai et al. | 704/9 |
| 2010/0228693 A1 * | 9/2010 | Dawson et al. | 706/12 |
| 2010/0257117 A1 | 10/2010 | Shvadron et al. | |
| 2010/0306155 A1 | 12/2010 | Giannetto | |

(Continued)

FOREIGN PATENT DOCUMENTS

WO 2010085523 A1 7/2010

OTHER PUBLICATIONS

"Computing Semantic Relatedness using Wikipedia-based Explicit Semantic Analysis" Gabrilovich, Evgeniy, et al, IJCAI, 2007 pp. 1606-1611.*

(Continued)

*Primary Examiner* — Kakali Chaki
*Assistant Examiner* — Isidore Sobkowski
(74) *Attorney, Agent, or Firm* — Brake Hughes Bellerman LLP

(57) ABSTRACT

Implementations include systems and methods generate data for training or evaluating semantic analysis engines. For example, a method may include receiving documents from a corpus that includes an authoritative set of documents from an authoritative source. Each document in the authoritative set may be associated with an entity. A second set of documents from the corpus that do not overlap with the first set may include at least one link to a document in the authoritative set, the at least one link being associated with anchor text. For each document in the second set, the method may include identifying entity mentions in the document based on the anchor text. The method may include associating the entity mention with the entity in a graph-structured knowledge base or associating entity types with the entity mention. The method may also include training a semantic analysis engine using the identified entity mentions and associations.

21 Claims, 7 Drawing Sheets

(56) References Cited

U.S. PATENT DOCUMENTS

2010/0306166 A1    12/2010    Pantel
2014/0040181 A1*   2/2014    Kuznetsov ..................... 706/55

OTHER PUBLICATIONS

Lao, et al, "Random Walk Inference and Learning in a Large Scale Knowledge Base", Conference on Empirical Methods in Natural Language Processing, Aug. 2011, 11 pages.

Lao, "Efficient Random Walk Inference with Knowledge Bases", Thesis, The Carnegie Mellon University, Jul. 2012, 139 pages.

Lao, et al, "Reading the Web with Learned Syntactic-Semantic Inference Rules", Proceedings of the 2012 Joint Conference on Empirical Methods in Natural Language Processing and Computational Natural Language Learning, 2012, 10 pages.

Lao, et al, "Relational retrieval using a combination of path-constrained random walks", Mach Learn (2010) 81: 53-67, Jul. 22, 2010, 15 pages.

Kahng, et al, "Ranking Objects by Following Paths in Entity-Relationship Graphs", PIKM '11, Oct. 28, 2011, 8 pages.

Singh, et al, "Large-Scale Cross-Document Coreference Using Distributed Inference and Hierarchical Models", Proceedings of the 49th Annual Meeting of the Association for Computational Linguistics: Human Language Technologies, vol. 1, Jun. 2011, 11 pages.

Lao, et al, "Fast Query Execution for Retrieval Models Based on Path-Constrained Random Walks", KDD '10, Jul. 25-28, 2010, 8 pages.

Agirre, et al., "Personalizing PageRank for Word Sense Disambiguation", Proceedings of the 12th Conference of the European Chapter of the ACL, 2009, pp. 33-41.

Haghighi, et al., "Robust Textual Inference via Graph Matching," Proceedings of Human Language Technology Conference and Conference on Empirical Methods in Natural Language Processing (HLT/EMNLP), Oct. 2005, pp. 387-394.

Kurant, et al., "Walking on a Graph with a Magnifying Glass: Stratified Sampling via Weighted Walks", ACM Sigmetrics, Jun. 2011, pp. 281-292.

Podgorelec, et al., "Decision Trees: An Overview and Their Use in Medicine", Journal of Medical Systems, vol. 26, No. 5, Oct. 2002, pp. 445-463.

Sornlertlamvanich, et al., "Automatic Corpus-Based Thai Word Extraction with the C4.5 Learning Algorithm", Proceedings of the 12th Conference of European Chapter of the ACL, 2009, pp. 802-807.

* cited by examiner

AUTOMATIC ANNOTATION FOR TRAINING AND EVALUATION OF SEMANTIC ANALYSIS ENGINES

BACKGROUND

Semantic analysis of documents in a corpus, such as web pages available over the Internet, can be used to better understand the content of the documents and the context of the content. However, a major hurdle to development of systems that perform semantic analysis, especially for large corpora, is that training and performance evaluation requires a large amount of annotated documents. Annotating documents can be tedious, time-consuming, and error-prone.

SUMMARY

Some implementations create a large set of annotated documents used to train and evaluate semantic analysis engines. The dataset may be based on web pages that link to an authoritative source, such as a fact repository or encyclopedia. Implementations take advantage of implicit tagging performed by the author of the web page that links to the authoritative source to achieve annotated documents with a high level of confidence in the annotations. To further increase bias in the annotated documents, some implementations remove documents from the dataset that are copies of pages from the authoritative source. For example, some authoritative sources are heavily curated by many editors and contributors, resulting in varying writing styles compared to the web in general. Removing such pages mitigates bias in the training data, which can lead to bad performance. The set of annotated documents can be used for various purposes, including training semantic analysis engines, and, because the confidence level of the annotations is high, evaluating semantic analysis engines. The set of annotated documents may include, for each web page, mentions of entities, the location in the document of an entity mention, and the location of the authoritative source page that the mention links to.

In one aspect, a computer system includes at least one processor and memory storing instructions that, when executed by the at least one processor, causes the computer system to perform operations. The operations may include receiving documents from a corpus, the corpus comprising an authoritative set of documents and a second set of documents. The authoritative set of documents may be from an authoritative source, with each document in the authoritative set being associated with an entity. The second set of documents may be documents that are not in the authoritative set and that are not copies of documents in the authoritative set but that each include at least one link to a document in the authoritative set, the at least one link being associated with anchor text. The operations may also include identifying, for each document in the second set, entity mentions in the document based on the anchor text, each entity mention including the anchor text and an identifier of the linked-to authoritative document, and associating the identified entity mentions with respective entity types based on content in the linked-to authoritative document. The method may further include training an entity tagging engine using the identified entity mentions and the entity types associated with the entity mentions.

These and other aspects can include one or more of the following features. For example, the entity mentions may be identified by matching a token in the anchor text with a token in a title of the linked-to authoritative document. The entity mentions may be further identified by matching a token in the anchor text with an alias for the linked-to authoritative document, the alias being defined by the authoritative source. In some implementations an alias is determined by a set of anchor texts within documents from the authoritative source linking to the linked-to authoritative document.

As another example, the operations may further include computing a fingerprint for sentences in each document of the authoritative set, computing a fingerprint for sentences in a particular document from the second set, comparing the fingerprints of the particular document with the fingerprints for the authoritative set, and removing particular document from the second set when a majority of fingerprints match. In some implementations, the entity type associated with a particular entity mention in a document in the second set is selected from categories associated with the linked-to authoritative document. In some implementations, the operations may also include extracting free text from the documents in the second set, so that entity mentions are identified from the free text. In some implementations, the identified entity mentions and associated entity types are further associated with respective offsets within the documents.

In another aspect a computer system comprises at least one processor, memory storing a graph-structured knowledge base, and memory storing instructions that, when executed by at least one processor, causes the computer system to perform operations. The operations may include receiving documents from a corpus, the corpus comprising an authoritative set of documents and a second set of documents. The authoritative set of documents may be from an authoritative source, with each document in the authoritative set being associated with an entity. The second set of documents may be documents that are not in the authoritative set and that are not copies of documents in the authoritative set but that each include at least one link to a document in the authoritative set, the at least one link being associated with anchor text. The operations may also include, for each document in the second set, identifying entity mentions in the document based on the anchor text, each entity mention including the anchor text and an identifier of the linked-to authoritative document and associating the entity mention with the entity in the graph-structured knowledge base associated with the linked-to authoritative document. The operations may also include training an entity matching engine using the identified entity mentions and associated entities.

These and other aspects can include one or more of the following features. For example, the entity mentions may be stored with an offset within the document for respective entity mentions and the offset may be used to determine a context of the entity mention. The context may be used in training the entity matching engine. In some implementations, entity mentions are identified by matching a token in the anchor text with a token in a title of the linked-to authoritative document and entity mentions may also be identified by matching a token in the anchor text with a token in the title of the linked-to authoritative document.

In another aspect, a computer-implemented method comprises obtaining, using at least one processor, a first document in a corpus of documents that has a link to an authoritative document, the link being associated with anchor text. The authoritative document may be from an authoritative source and be associated with an entity. The first document may be from a source other than the authoritative source. The method may also include determining, using the at least one processor, whether a majority of content of the first document matches content from one of the documents in the authoritative source and identifying at least one entity mention in the first document when it is determined that the majority of the content does not match content from one of the documents in the authoritative source. The entity mention may include the anchor text, an identifier of the linked-to authoritative document, and a position of the mention within the content of the document. The method may further include storing the entity mentions in memory and repeating the obtaining, determining, identifying, and storing for other documents in the corpus. The method may finally include evaluating a semantic analysis engine using the stored entity mentions and information associated with the documents in the authoritative source.

These and other aspects can include one or more of the following features. For example, the semantic analysis engine may be an entity matching engine, and the anchor text is considered an entity. As another example, the semantic analysis engine is an entity tagging engine and the method further includes associating the stored entity mentions with respective entity types based on categories associated with the linked-to authoritative document and evaluating the entity tagging engine using the stored entity mentions and the associated entity types. As another example, at least one million documents in the corpus may include links to documents in the authoritative source.

One or more of the implementations of the subject matter described herein can be implemented so as to realize one or more of the following advantages. As one example, the system may enable automatic creation of tens of millions of high quality entity mentions from free text in millions of documents, such as web pages. The mentions are high quality because they take advantage of an implicit annotation of the document by its author. This large amount of annotated data enables accurate large-scale evaluation of semantic analysis engines and provides the ability to specify custom subsets of the data for specific tasks through, for example, the use of entity tags or entity relations in a data graph. As another example, because the mentions can be from web-based documents, the set of annotated documents allows the context of the mention to be used in noun phrase identification, entity matching, reference resolution, and document co-reference. Furthermore, because the context may come from free text associated with web pages, the contexts are varied and similar to real-world usages. This feature helps train machine-learning semantic analysis engines to correctly process free text in other documents. The trained semantic analysis engines may be used to analyze free text in documents. The analyzed text may be used to add new entities to the data graph, new relationships between entities in the data graph, to answer queries from the data graph, etc. Additionally, because the entity mentions tie directly to an authoritative document associated with an entity and previously categorized, granular entity tagging can be achieved.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
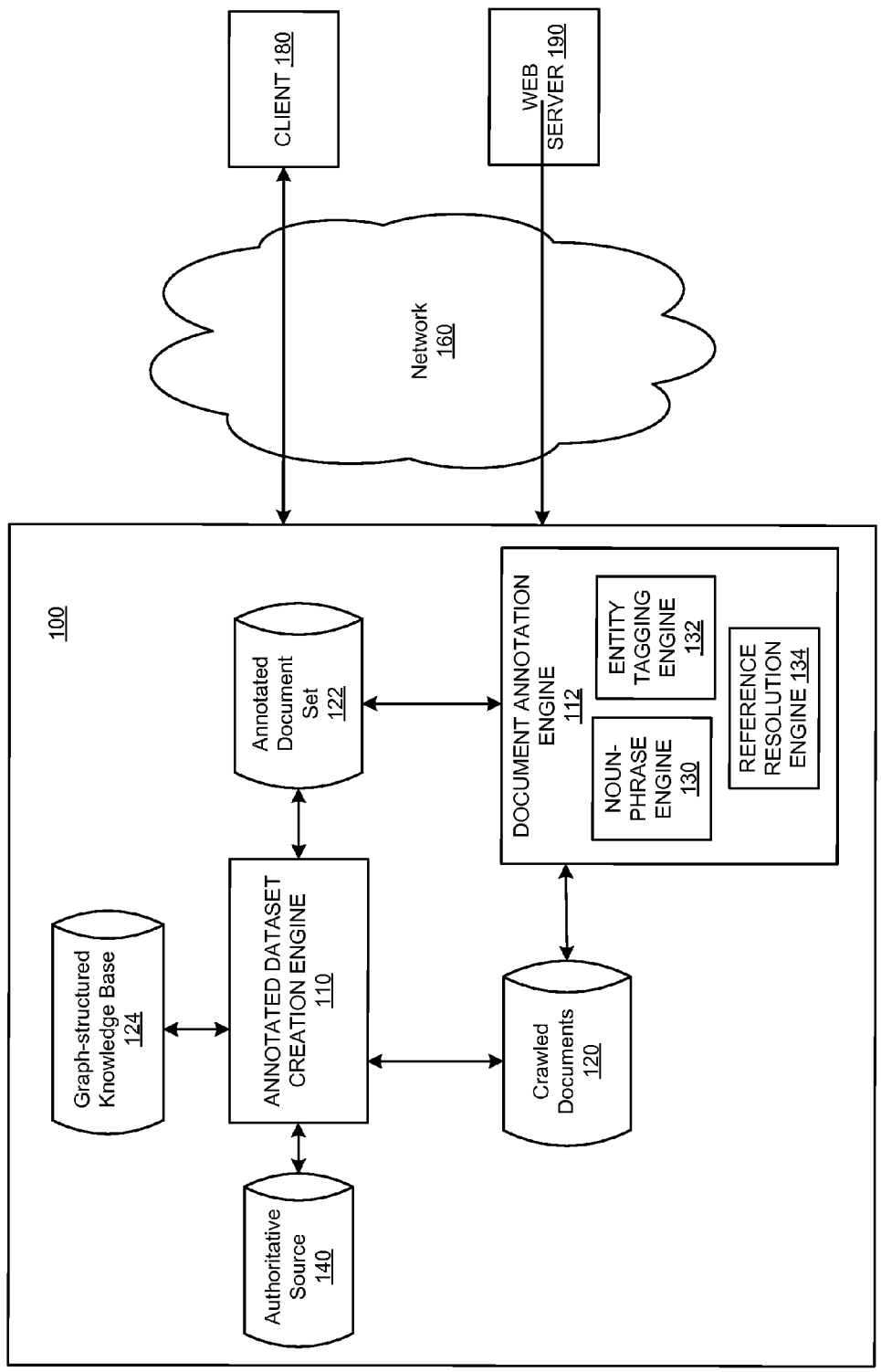
FIG. 1 illustrates an example system in accordance with the disclosed subject matter.

FIG. 1 is a block diagram of an automatic entity annotation system in accordance with an example implementation. The system 100 may be used to obtain high-quality entity annotated documents used to train and evaluate semantic analysis engines using the techniques described herein. The depiction of system 100 in FIG. 1 is described as an annotation system for annotating web-based documents using Wikipedia as an authoritative source. However, other configurations and applications may be used. For example, the annotated documents may originate from another document corpus, such as internal documents not available over the Internet, from a corpus of scientific documents, or from some other large corpus with inter-document references and an authoritative source of documents.

Figure 6:
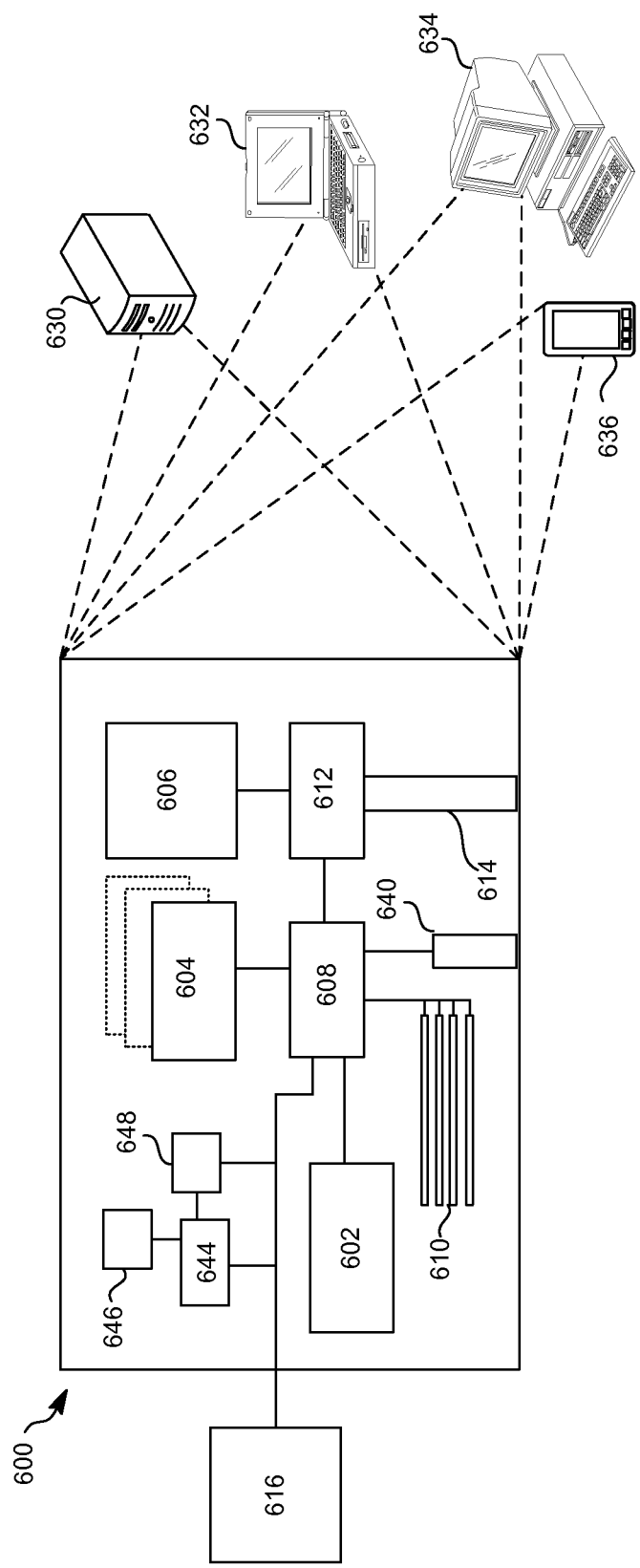
FIG. 6 shows an example of a computer device that can be used to implement the described techniques.
Figure 7:
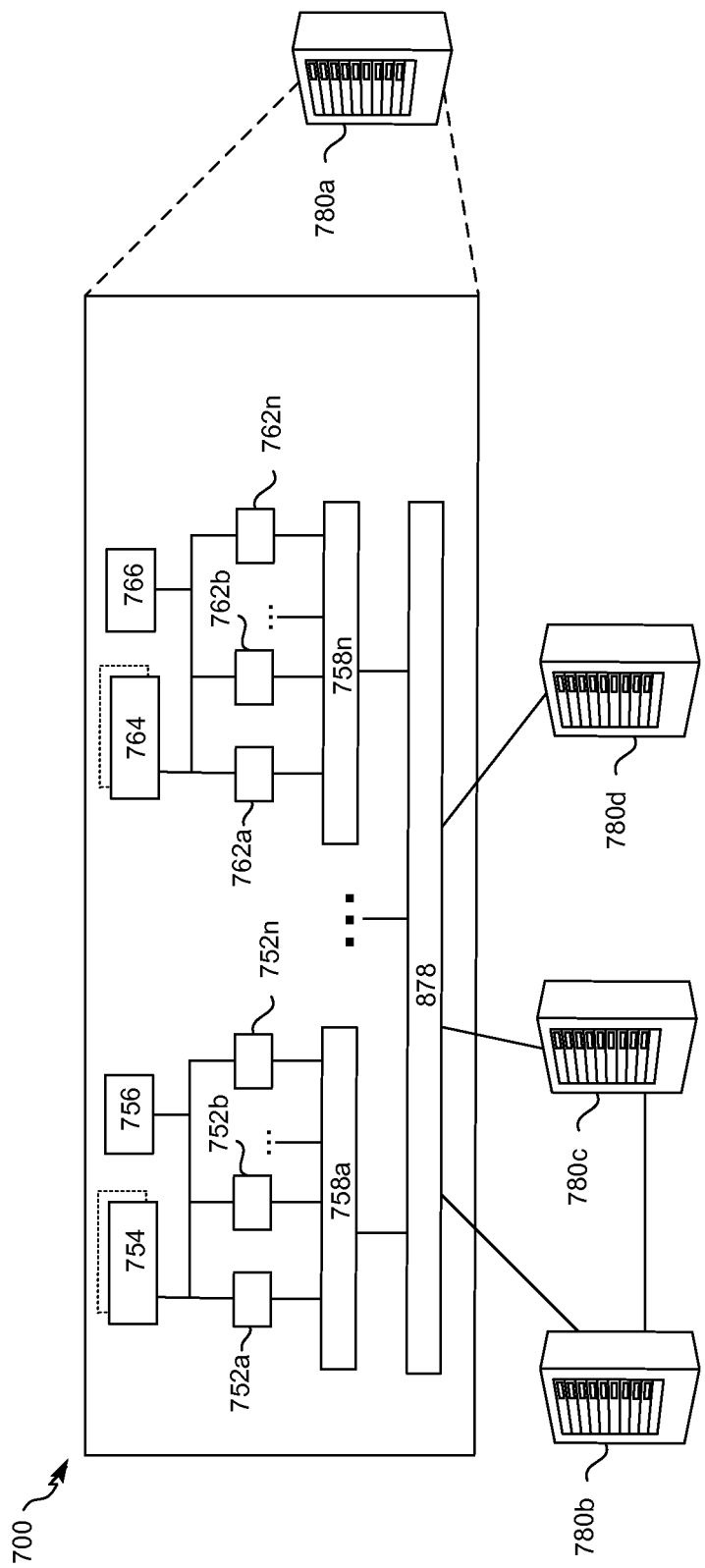
FIG. 7 shows an example of a distributed computer device that can be used to implement the described techniques.

The automatic entity annotation system 100 may be a computing device or devices that take the form of a number of different devices, for example a standard server, a group of such servers, or a rack server system. In addition, system 100 may be implemented in a personal computer, for example a laptop computer. The automatic entity annotation system 100 may be an example of computer device 600, as depicted in FIG. 6 or computer device 700, as depicted in FIG. 7.

The automatic entity annotation system 100 may include a graph-structured knowledge base 124. Such a data graph stores nodes and edges. The node in a data graph may represent an entity, such as a person, place, item, idea, topic, abstract concept, concrete element, other suitable thing, or any combination of these. Entities in the graph may be related to each other by edges, which may represent relationships between entities. For example, the data graph may have an entity that corresponds to the actor Kevin Bacon and the data graph may have an acted in relationship between the Kevin Bacon entity and entities representing movies that Kevin Bacon has acted in. A data graph with a large number of entities and even a limited number of relationships may have billions of connections. In some implementations, graph-structured knowledge base 124 may be stored in an external storage device that is accessible from system 100. The graph-structured knowledge base 124 may include connections with documents from the authoritative source. For example the entities in the knowledge base 124 may correspond to a Wikipedia page. Of course other types of connections are possible, such as entities corresponding to a chapter, a book, a paragraph, etc., from the authoritative source. Furthermore, an authoritative source with internal links, such as Wikipedia, may itself be considered a data graph, with each page being an entity and the links between pages being edges in the graph. Thus, in some implementations, the authoritative source 140 may also serve as the graph-structured knowledge base 124. Wikipedia pages are used as one example of an authoritative source, but other wiki's, encyclopedias, or fact repositories may be used.

Although not shown in FIG. 1, the automatic entity annotation system 100 can include one or more processors configured to execute one or more machine executable instructions or pieces of software, firmware, or a combination thereof. The automatic entity annotation system 100 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The modules may include an annotated dataset creation engine 110 and a document annotation engine 112. The annotated dataset creation engine 110 may analyze information from crawled document sources, such as crawled documents 120, to create a set of high-quality entity mentions found within the crawled documents. The crawled documents 120 may be documents obtained using known or later developed web-crawling techniques, for example. In some implementations, the crawled documents 120 represent documents available over the Internet. In some implementations, the crawled documents 120 may include a source of authoritative documents, such as the web pages available at the domain wikipedia.org. Authoritative sources are sources that generally include content recognized as respected, accurate, or informative and having individual documents, chapters, sections, etc., that may map to individual entities in the knowledge base 124. An authoritative source may be distinguishable by the number or percentage of documents not included in the authoritative source that have references to the documents that belong to the source. In some implementations, if more than one million independent documents link to documents in the source, the source is authoritative. For example, Wikipedia is an authoritative source because approximately 9.5 million web pages not associated with the wikipedia.org domain, include links to Wikipedia-based web pages. Furthermore, Wikipedia web pages generally represent a single entity, with the title of the Wikipedia page describing a name for the entity, so the entity is easily identified. In some implementations the authoritative documents may be stored in a source separate from crawled documents 120, such as authoritative source 140. Authoritative source 140 may be stored in an external storage device accessible from system 100.

The crawled documents 120 may also include documents that have one or more references to documents in the authoritative source. For example, the crawled documents 120 may include web pages that link to a Wikipedia web page. The annotated dataset creation engine 110 may analyze these documents to identify entity mentions. For example, if a document has content about John Smith, and includes the text John Smith as anchor text for a link to the Wikipedia page http://en.wikipedia.org/wiki/John_Smith_(astronomer), then the annotated dataset creation engine 110 may treat the link and its anchor text as a mention of the entity John Smith, British astronomer from the 1700s. Anchor text is the text that the author of the document identifies as being part of a link or otherwise describing or identifying a reference to a target document. In the previous example, because the author of the document explicitly links the text John Smith to a particular Wikipedia page, the annotated dataset creation engine 110 can identify the anchor text as a mention for John Smith the British astronomer, as opposed to any of the numerous other entities associated with the name John Smith. This entity mention identification by the annotated dataset creation engine 110 carries a high level of confidence because the author of the web page implicitly annotated the text by choosing the link. Thus, the annotated dataset creation engine 110 may look for documents that have links to Wikipedia pages, parse the links, and generate a dataset of entity mentions from the documents, as will be explained in more detail with regard to FIG. 2. Once the annotated dataset creation engine 110 has identified entity mentions in the documents that link to Wikipedia pages, the annotated dataset creation engine 110 may store the documents, the entity mentions within the documents, and context regarding the entity mention in a file, such as annotated document set 122. The file may then be used to train and evaluate semantic analysis engines.

The automatic entity annotation system 100 may also include a document annotation engine 112. The document annotation engine may be an engine that performs semantic analysis on documents, such as crawled documents 120. Semantic analysis is a key step in natural language processing. For example, given a particular free-text document, such as a web page, understanding the semantics of text in the web page may involve several types of analysis, such as noun-phrase segmentation, entity tagging, and reference resolution. Semantic analysis may be useful in analyzing documents to determine additional entity mentions, relationships between entities, etc. Accordingly, properly training such engines may assist in the expansion of the graph-structured knowledge base. Noun-phrase segmentation includes correctly identifying, or segmenting, noun phrases, such as the phrases "Barack Obama," "Secretary Clinton," or "First Lady." In other words, noun-phrase segmentation aims to identify potential mentions of entities, including the words used to describe them. Noun-phrase segmentation can also be referred to as noun-noun compound identification, mention identification, and mention chugging. Thus, references to noun-phrase segmentation or a noun-phrase engine are understood to also refer to entity mentions, mention chugging, and noun-noun compounds. Entity tagging involves adding tags to the identified noun-phrases. Entity tags may be coarse categories, such as 'person,' 'organization,' or 'location,' or they may be more granular descriptions, such as 'presidents,' 'living people,' 'lawyers,' 'Olympic gold-medalists,' 'state capitals,' 'national parks,' 'federal agencies,' 'intelligence organizations,' etc. An entity tagging engine may use the context of an entity mention in the document to assign one or more entity tags to the mention, but entity tagging at a granular level is much more difficult to do automatically, especially without a large amount of training data to properly train entity tagging engines. In a free-text corpus, such as documents available over the Internet, automatic entity tagging has generally only been possible at the coarse level. However, the set of annotated documents created by the annotated dataset creation engine 110 provides a large training set for entity tagging, which allows more granular tagging and better semantic analysis results.

Reference resolution may involve determining the noun-phrase that a pronoun or pronominal refers to, and determining which authoritative page or entity from a graph matches a noun-phrase in a document. The document annotation engine 112 may include one or more of these semantic analysis engines. Because semantic analysis engines are machine-learning, they typically require training data. The training data allows the semantic analysis engines to learn how to correctly process their intended data. Training data generally includes data that has been annotated to tell the semantic analysis engine how it should interpret the data. The annotated document set 122 provides a large body of documents that have been annotated with entity mentions and their context. Thus, the document annotation engine 112 may use annotated document set 122 to train one or more of an entity tagging engine 132, a noun-phrase engine 130, and a reference resolution engine 134. In some implementations, the annotated document set 122 may also be used to evaluate the performance of one or more semantic analysis engines. For example, automatic annotation system 100 may allow a comparison of the entity mentions found in a particular document by the noun-phrase engine 130 to be compared with the entity mentions generated by the annotated dataset creation engine 110. If the annotated dataset creation engine 110 locates more entities than the noun-phrase engine 130, the noun-phrase engine 130 may need additional training, for example.

Automatic annotation system 100 may be in communication with client(s) 180 over network 160. Clients 180 may allow a user to monitor and direct the training and/or evaluation of the semantic analysis engines. Network 160 may be for example, the Internet or the network 160 can be a wired or wireless local area network (LAN), wide area network (WAN), etc., implemented using, for example, gateway devices, bridges, switches, and/or so forth. Via the network 160, the automatic annotation system 100 may communicate with and transmit data to/from clients 180. In some implementations, automatic annotation system 100 may be in communication with or include other computing devices that provide updates to the graph-structured knowledge base 124 and crawled documents 120. For example, automatic annotation system 100 may include or be in communication with an indexing engine that crawls web server(s) 190 for documents and indexes the contents of the documents. Automatic annotation system 100 represents one example configuration and other configurations are possible.

Figure 2:
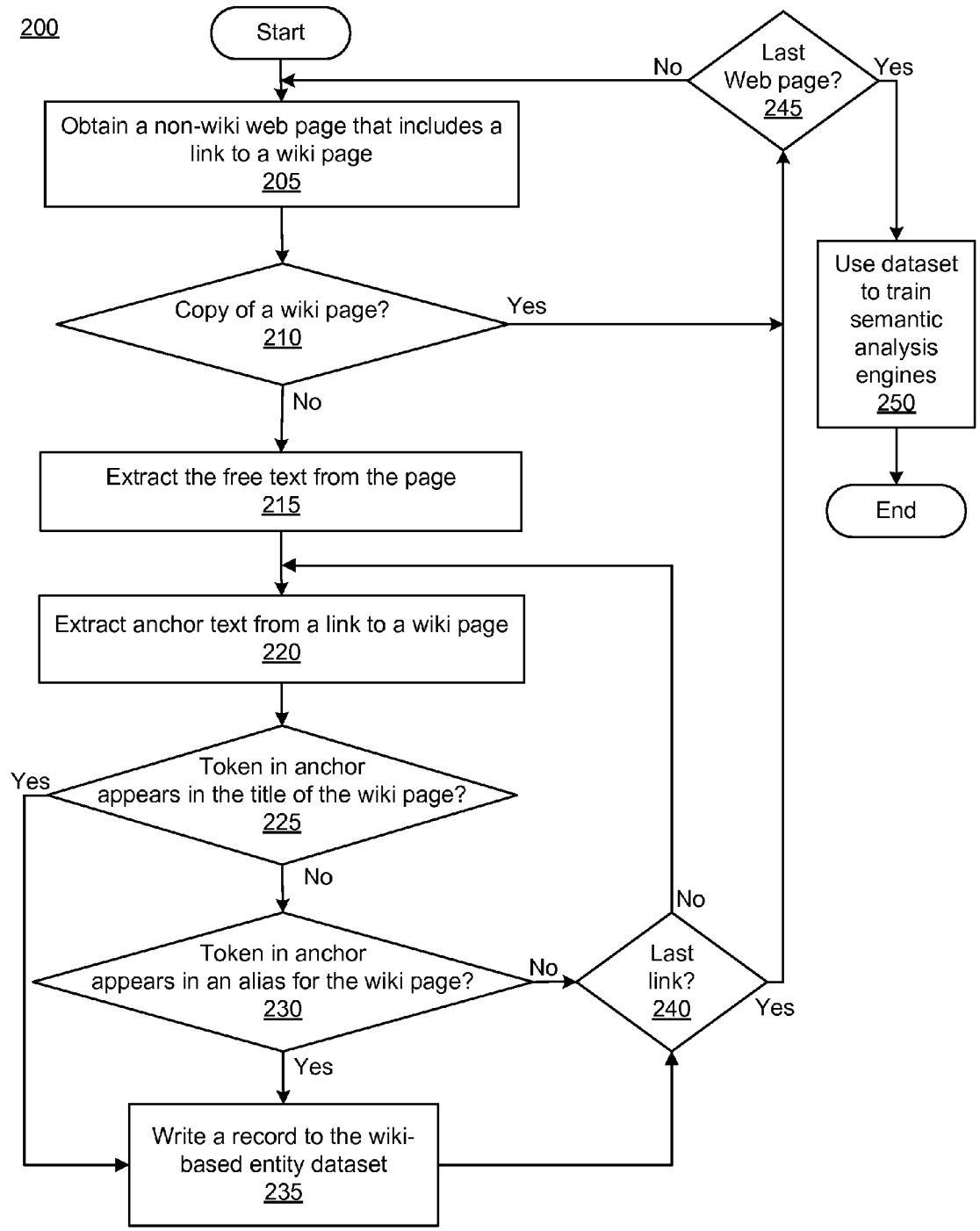
FIG. 2 illustrates a flow diagram of an example process for creating automatically annotated documents for evaluation and training of semantic analysis engines.

FIG. 2 illustrates a flow diagram of an example process 200 for creating automatically annotated documents for evaluation and training of semantic analysis engines. Process 200 may be performed by an automatic annotation system, such as system 100 of FIG. 1. Process 200 may begin by the automatic annotation system obtaining a document not from an authoritative source that includes a reference to a document within the authoritative source (205). For example, from a corpus of documents from the Internet, the automatic annotation system may look for documents that are not from the Wikipedia.org domain that include a link to a document in the Wikipedia.org domain. The document within the authoritative source may be considered an authoritative document. Although shown in FIG. 2 as a web page, a document may include any file that contains text, data, or other information. Furthermore, a document may refer to the document itself or the content of the document, for example content extracted during a web crawl.

The automatic annotation system may optionally determine whether the document essentially copies the content of an authoritative document (210). For example, because there are many web-based documents that contain copies of Wikipedia pages, the automatic annotation system may remove such pages to keep the automatically annotated data unbiased. In one implementation, the automatic annotation system computes a fingerprint for each sentence in web pages available through Wikipedia.org. The automatic annotation system may then compute a fingerprint for the sentences found in a particular document that is not from Wikipedia.org. If a majority of the sentences from the particular document match sentences in any authoritative document, based on matching fingerprints (201, Yes), the automatic annotation system may skip the particular document and proceed to step 245. In some implementations, the automatic annotation system considers the document a copy when more than 70% of the fingerprints match for to consider the document a copy.

If the automatic annotation system determines that the document is not a copy (210, No), the automatic annotation system may extract free text from the document (215). Free text includes text that does not appear in tables, near images, in obvious boilerplate. Implementations that operate on data associated with images or tables may extract the images and tables and their captions in addition to the free text, but not boilerplate. The automatic annotation system may then extract the anchor text associated with a reference to an authoritative document (220). Anchor text may be any text that the author of the document associates with the reference. For example, in an HTML document, an anchor tag may establish a link to a Wikipedia document. The text that falls between the start-anchor tag and the end-anchor tag may be considered anchor text. Other methods of referencing documents may include other ways of establishing anchor text.

The automatic annotation system may then compare tokens from the anchor text with text from the authoritative document that represents an entity (225). For example, a Wikipedia page may include a title, and the title may be considered the name of an entity. In such an implementation, the automatic annotation system may compare tokens, such as words, from the anchor text to tokens in the title. If at least one token matches (225, Yes), the reference may be considered an entity mention, and the automatic annotation system may write a corresponding record to a file of entity mentions (235). In some implementations a token may be a whole word or a phrase of two or more words. The file of entity mentions may include data that identifies the document, data that identifies the anchor text and where in the document the anchor text occurs, and data that identifies the target document, or the authoritative document referenced. In some implementations, the file may also include a version identifier for the document. In some implementations the file may include the block of text surrounding the anchor text rather than the position of the anchor text within the document. Of course, other information may be included in the file. The file may include a database, a text file, an XML file, or any other type of information storage.

If no tokens match (225, No), the automatic annotation system may compare the tokens in the anchor text with an alias for the authoritative document (230), the alias being established by the authoritative source. For example, Wikipedia pages include links to other Wikipedia pages. Anchor text for such intra-Wikipedia page references is considered an alias for the target of the link. A target is the page or document that the link identifies or points to. In some implementations, the alias may be explicitly assigned by an author of the authoritative document, for example through a special tag. If at least one token in the anchor text matches an alias of the authoritative document (230), the automatic annotation system may consider the reference an entity mention and include the reference in the file of entity mentions (235), as described above.

If the anchor text does not match an alias (230, No), or after writing the entity mention to the file (235), the automatic annotation system may look for another reference in the document (240). If another reference to an authoritative document is found (240, No), the automatic annotation system may repeat steps 220 to 240 for the next reference. If no other references are found (240, Yes), the automatic annotation system may determine whether any other documents remain to be analyzed (245). If the automatic annotation system finds any remaining documents (245, No), the automatic annotation system may repeat steps 205 to 240 for one of the remaining documents. Otherwise (245, Yes), the automatic annotation system has generated a set of automatically annotated entity mentions that can be used to train and/or evaluate one or more semantic analysis engines (250).

Figure 3:
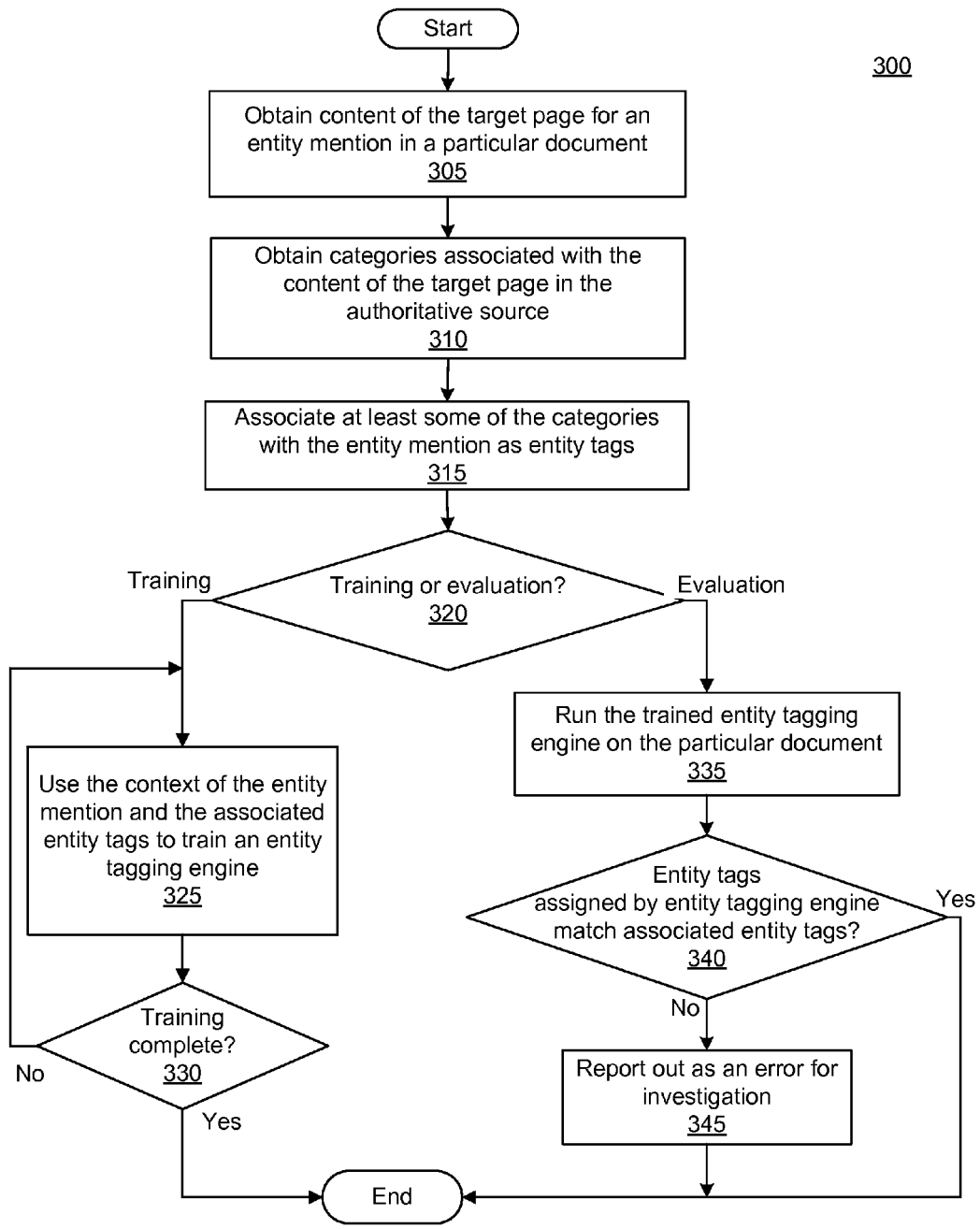
FIG. 3 illustrates a flow diagram of an example process for using a set of annotated documents to train and/or evaluate an entity tagging engine.

FIG. 3 illustrates a flow diagram of an example process 300 for using the set of annotated documents to train and/or evaluate an entity tagging engine. Process 300 may be performed by an automatic annotation system, such as system 100 of FIG. 1, as part of step 250 of FIG. 2. For example, as part of training an entity tagging engine, the automatic annotation system may read a record from the set of entity mentions and obtain the content of the target page for the entity mention of a particular document (305). As explained above, the target page is the authoritative document that the reference in the particular document refers to. In some implementations the content of the authoritative document may be stored, for example, in a repository of crawled documents, such as crawled documents 120 of FIG. 1. The automatic annotation system may then obtain categories associated with the target from the authoritative source (310). For example, a Wikipedia page may include one or more categories associated with the page. For example, the Wikipedia page for the British astronomer John Smith is associated with the categories of '1711 Births,' '1795 Deaths,' and 'Professor of Astronomy.' The automatic annotation system may use the categories associated with the target page to associate one or more entity tags with the entity mention (315). The automatic annotation system may use various levels of granularity to assign entity tags. For example, based on either the category '1711 Births' or 'Professor of Astronomy' the automatic annotation system may associate the entity tag of 'person' to the entity mention. At a finer level of granularity, the automatic annotation system may associate entity tags of 'Professor of Astronomy,' "Professor," "Astronomer," or even "$18^{th}$ Century Astronomer" to the entity mention. In some implementations the system may use a map of categories to entity tags to associate the entity tags with a particular entity mention. As demonstrated, the automatic annotation system may use a single category or a combination of categories to assign entity tags to an entity mention. Although not shown in FIG. 3, the automatic annotation system may repeat steps 305 to 315 for each entity mention in a document, and for each document in the set of entity mentions.

The resulting associations between entity mentions and tags may then be used to train or evaluate an entity tagging engine (320). As previously discussed, an entity tagging engine may be a kind of semantic analysis engine used as part of an information extraction pipeline. The entity tagging engine may strive to classify entity mentions found in free text into one or more entity types. Entity types may be coarse to fine. If the automatic annotation system is using the annotated set of entity mentions to train an entity tagging engine (320, Training), the set and the associated entity tags may be used as input for the machine-learning process that trains the entity tagging engine (325). Using the granular entity tags associated with the entity mentions in the set, and the context surrounding the mentions, the automatic annotation system may be able to train a highly specific, accurate entity tagging engine. This is because the file includes a large number of automatically-identified, high-quality, granular annotations to use in the machine-learning process. Furthermore, in some implementations a subset of the set of entity mentions may be used to train the entity tagging engine. Because the training process can be iterative, if training is not complete (330, No), the training process may be invoked again. When the training process reaches conclusion (330, Yes), process 300 ends. In some implementations the model generated by training the entity tagging engine may be used to evaluate the entity tagging engine.

If the set of annotated documents is used to evaluate an entity tagging engine (320, Evaluation), the automatic annotation system may use the entity tagging engine to tag at least some of the documents represented in the set of annotated documents (335). For example, if document X is in the set of annotated documents, document X may also be analyzed by the entity tagging engine. The automatic annotation system may then compare the results of the entity tagging engine with the tags associated with the entity mentions for the annotated document (340). If the entity tagging engine has generated the same entity tags as are associated with the entity mentions in the set of annotated documents (340, Yes), the entity tagging engine may be considered accurate. Otherwise (340, No), discrepancies may be reported or otherwise brought to the attention of a user for further investigation (345). For example, the entity tagging engine may need further training in an area identified by the reported discrepancies. Once the training or evaluation is complete, process 300 ends.

Figure 4:
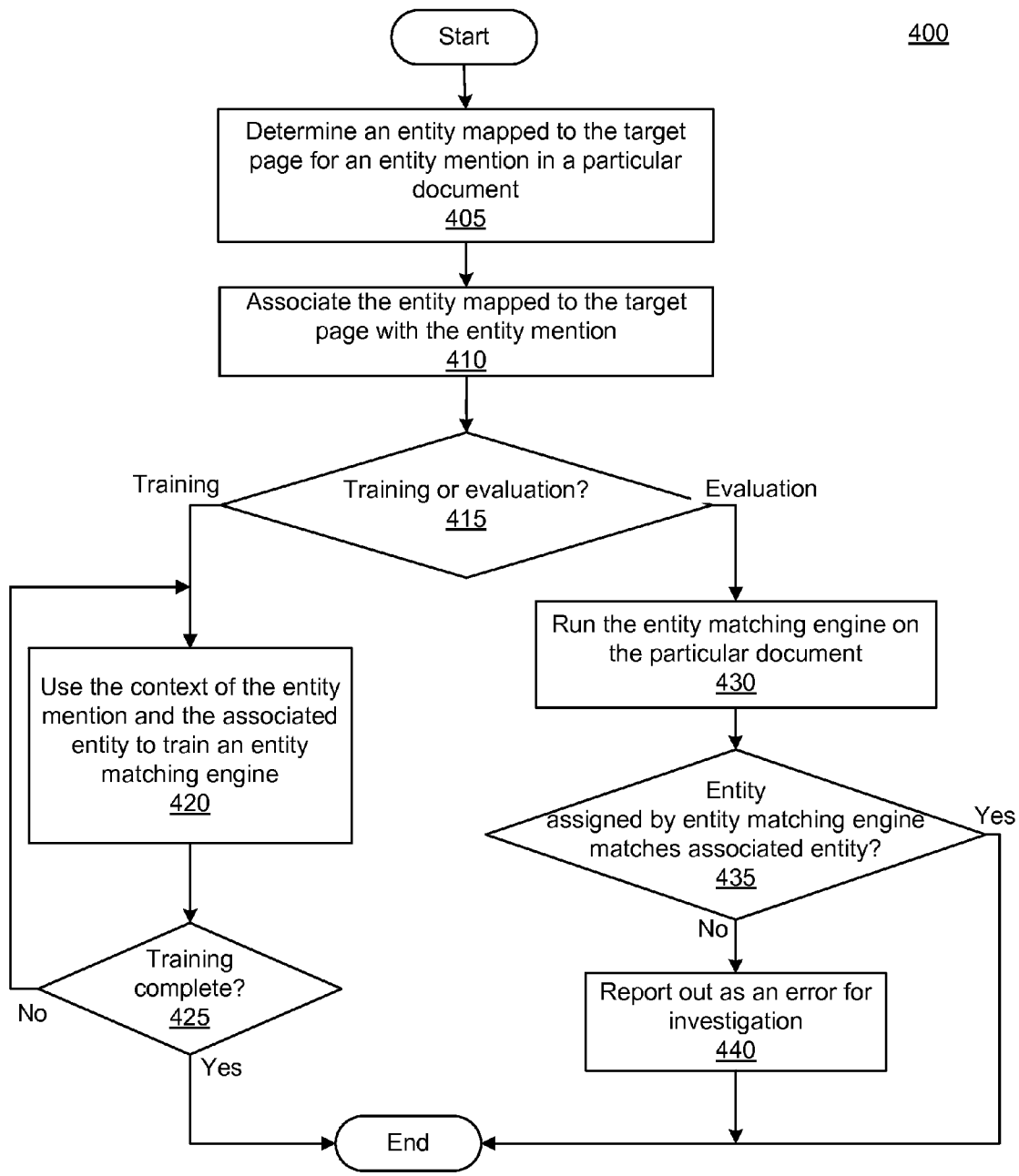
FIG. 4 illustrates a flow diagram of an example process for using a set of annotated documents to train and/or evaluate an entity matching engine.

FIG. 4 illustrates a flow diagram of an example process 400 for using a set of annotated documents to train and/or evaluate an entity matching engine. Process 400 may be performed by an automatic annotation system, such as system 100 of FIG. 1, as part of step 250 of FIG. 2. For example, as part of training or evaluating an entity matching engine, the automatic annotation system may determine an entity mapped to the target page for an entity mention in the set of annotated documents (405). For example, the automatic annotation system may have a mapping that associates at least some of the authoritative documents with an existing entity in a graph-structured knowledge base, such as datastore 124 of FIG. 1. In some implementations, not shown in FIG. 4, if an entity from the graph-structured knowledge base cannot be matched to the entity mention in step 405, the automated annotation system may add the entity to the graph-structured knowledge base. Because each entity mention in the set of annotated documents refers to a particular authoritative document, the automatic annotation system may associate the entity mention in the set with the entity that is currently mapped to the target of the entity mention (410). The automatic annotation engine may repeat steps 405 and 410 for each entity mention in the set of annotated documents, so that as many entity mentions as possible are mapped to an entity in the graph-structured knowledge base. The automatic annotation system may use these entity associations to train or evaluate an entity matching engine (415).

As explained above, an entity matching engine may strive to match free text to entities based on the context of the noun-phrase in the free text. Entities may be defined by a graph-structured knowledge base, or entities may be defined by, for example, pages in the authoritative source. For example, the graph-structured knowledge base may include multiple entities with the name John Smith. Therefore, the entity matching engine may strive to determine which John Smith entity the free text is referring to. Because the set of annotated documents includes highly-accurate disambiguated entity mentions that have been accurately mapped to known entities in the graph-structured knowledge base, the set may be used to train the entity matching engine (420). Because the set of annotated documents may include context information, the entity matching engine may learn how to use the context to disambiguate ambiguous entity references, e.g., noun-phrases, in other documents. Because the training process can be iterative, if training is not complete (425, No), the training process may iterate. When the training process reaches conclusion (425, Yes), process 400 ends.

If the file is to be used for evaluation, the automatic annotation system may select a document from the set of annotated documents and use the entity matching engine to match an entity in the graph-structured knowledge base to an entity mention in the selected document (430). If the entity identified by the entity matching engine matches the entity associated with the entity mention in the set of annotated documents (435, Yes), the automatic annotation system may consider the entity matching engine successful. Otherwise (435, No), the automated annotation system may notify an operator that the entity matching engine was not successful for the particular entity mention (440). The operator may choose to modify the entity matching engine or perform additional training for the engine. Process 400 then ends.

Figure 5:
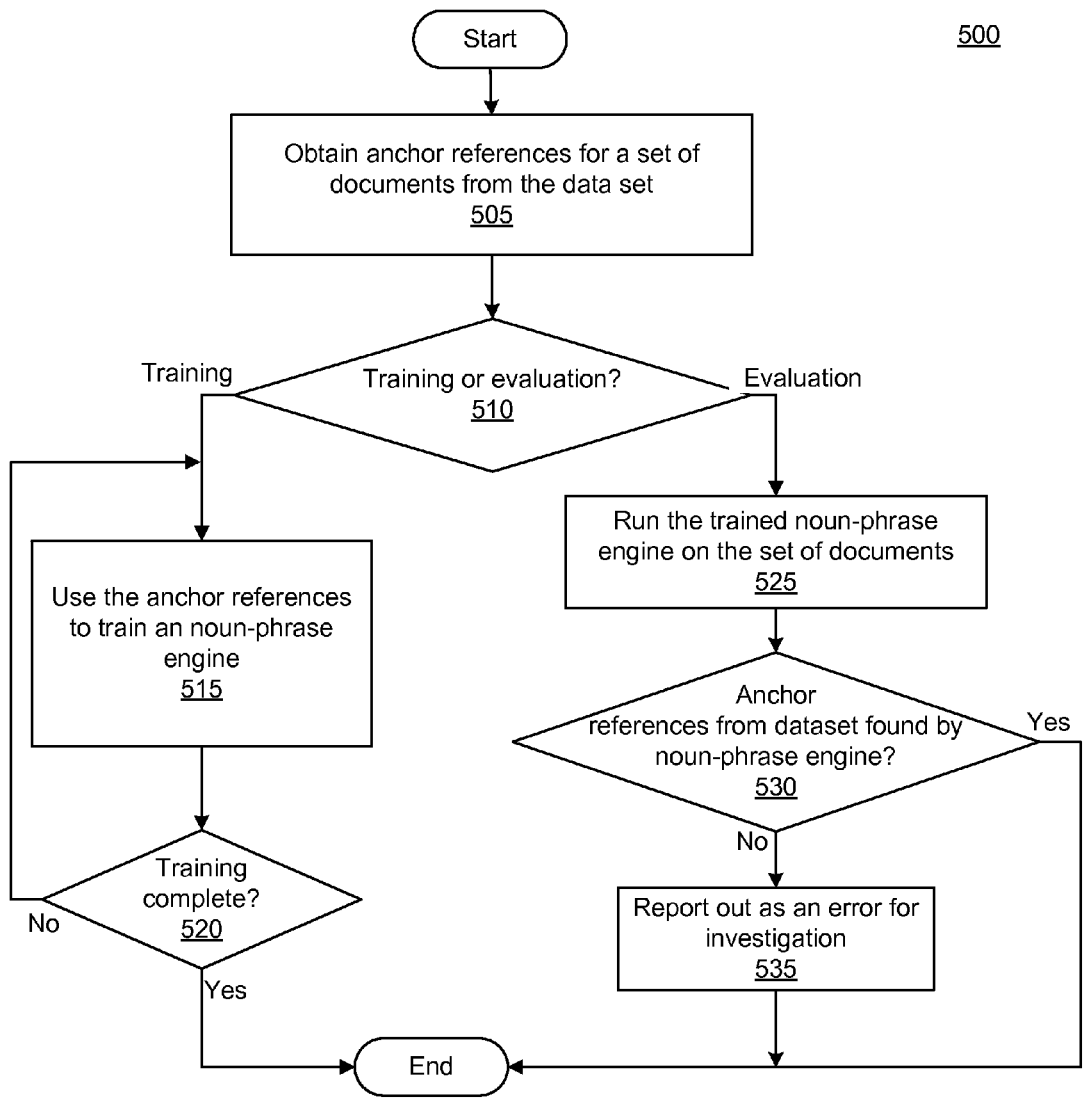
FIG. 5 illustrates a flow diagram of an example process for using a set of annotated documents to train and/or evaluate a noun-phrase engine.

FIG. 5 illustrates a flow diagram of an example process 500 for using the set of annotated documents to train and/or evaluate noun-phrase engine. Process 500 may be performed by an automatic annotation system, such as system 100 of FIG. 1, as part of step 250 of FIG. 2. For example, as part of training a noun-phrase engine, the automatic annotation system may read records from the set of entity mentions to obtain a set of anchor references for a set of documents (505). As explained above, the text of the anchor references stored in the set of entity mentions can be considered an entity mention with a high degree of confidence.

The resulting entity mentions may then be used to train or evaluate a noun-phrase engine (510). As previously discussed, a noun-phrase engine may be a kind of semantic analysis engine used as part of an information extraction pipeline. The noun-phrase engine may strive to identify spans in the document that could be mentions of entities. If the automatic annotation system is using the annotated set of entity mentions to train a noun-phrase engine (510, Training), the anchor references from the data set may be used as input for the machine-learning process that trains the noun-phrase engine (515). Using the text located within the anchor tags, the automatic annotation system may be able to train a highly specific, accurate noun-phrase engine because the authors of the documents have, themselves, annotated the document. As indicated above, the training process may iterate until the system receives an indication that the training is complete (520, Yes).

If the set of entity mentions is used to evaluate a noun-phrase engine (510, Evaluation), the automatic annotation system may use the noun-phrase engine to tag at least some of the documents represented in the set of documents (525). The automatic annotation system may then compare the results of the noun-phrase identification with the anchor references found in the data set (530). If the noun-phrase engine has identified the anchor references from the dataset as noun-phrases (530, Yes), the noun-phrase engine may be considered accurate. Otherwise (530, No), discrepancies may be reported or otherwise brought to the attention of a user for further investigation. For example, the noun-phrase engine may need further training in an area identified by the reported discrepancies. Once the training or evaluation is complete, process 500 ends.

The set of annotated documents produced by process 200 may be used to train and evaluate other semantic analysis engines, such as a co-reference engine. For example, in training a document co-reference engine, two occurrences of anchor text that refer to the same authoritative document may be considered co-referential.

FIG. 6 shows an example of a generic computer device 600, which may be system 100, and/or client 170 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

FIG. 7 shows an example of a generic computer device 700, which may be system 100 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A computer system comprising:
at least one processor; and
memory storing instructions that, when executed by the at least one processor, causes the computer system to perform operations comprising:

receiving documents from a corpus, the corpus comprising:
  an authoritative set of documents from an authoritative source, each document in the authoritative set being associated with an entity, and
  a second set of documents, the second set being documents that are not in the authoritative set and that are not copies of documents in the authoritative set but that each include at least one link to a document in the authoritative set, the at least one link being associated with anchor text,
identifying, for each document in the second set, entity mentions in the document based on the anchor text, each entity mention including the anchor text and an identifier of the linked-to authoritative document,
associating the identified entity mentions with respective entity types based on content in the linked-to authoritative document, and
training an entity tagging engine using the identified entity mentions and the entity types associated with the entity mentions.

2. The system of claim 1, wherein entity mentions are identified by matching a token in the anchor text with a token in a title of the linked-to authoritative document.

3. The system of claim 2, wherein entity mentions are further identified by matching a token in the anchor text with an alias for the linked-to authoritative document, the alias being defined by the authoritative source.

4. The system of claim 3, wherein alias is determined by a set of anchor texts within documents from the authoritative source linking to the linked-to authoritative document.

5. The system of claim 1, wherein the instructions, when executed by the at least one processor, further cause the computer system to perform the operations of:
  computing a fingerprint for sentences in each document of the authoritative set;
  computing a fingerprint for sentences in a particular document from the second set;
  comparing the fingerprints of the particular document with the fingerprints for the authoritative set; and
  removing particular document from the second set when a majority of fingerprints match.

6. The system of claim 1, wherein the entity type associated with a particular entity mention in a document in the second set is selected from categories associated with the linked-to authoritative document.

7. The system of claim 1, wherein the instructions, when executed by the at least one processor, further cause the computer system to perform the operation of extracting free text from the documents in the second set, so that entity mentions are identified from the free text.

8. The system of claim 1, wherein the identified entity mentions and associated entity types are further associated with respective offsets within the documents.

9. A computer system comprising:
  at least one processor;
  memory storing a graph-structured knowledge base; and
  memory storing instructions that, when executed by at least one processor, causes the computer system to perform operations comprising:
    accessing an authoritative set of documents from a corpus of documents, the authoritative set of documents being from an authoritative source, each document in the authoritative set being associated with a respective entity in the graph-structured knowledge base,
    identifying a second set of documents from the corpus of documents, the second set being documents that are not in the authoritative set and that are not copies of documents in the authoritative set but that each include at least one hyperlink to a document in the authoritative set, the at least one hyperlink being associated with anchor text,
    for each document in the second set:
      identifying an entity mention in the document based on the anchor text, the entity mention including the anchor text and an identifier of the linked-to authoritative document, and
      associating the entity mention with the entity in the graph-structured knowledge base associated with the linked-to authoritative document, and
    training an entity matching engine using the identified entity mentions and associated entities.

10. The system of claim 9, wherein the entity mention is stored with an offset within the document for respective entity mentions.

11. The system of claim 10, wherein the offset is used to determine a context of the entity mention, the context being used in training the entity matching engine.

12. The system of claim 11, wherein entity mentions are identified by matching a token in the anchor text with a token in a title of the linked-to authoritative document.

13. The system of claim 12, wherein entity mentions are further identified by matching a token in the anchor text with a token in the title of the linked-to authoritative document.

14. A computer-implemented method comprising:
  obtaining, using at least one processor, a first document in a corpus of documents that has a link to an authoritative document, the link being associated with anchor text, the authoritative document being from an authoritative source and being associated with an entity, and the first document being from a source other than the authoritative source;
  determining, using the at least one processor, whether a majority of content of the first document matches content from one of the documents in the authoritative source;
  identifying at least one entity mention in the first document when it is determined that the majority of the content does not match content from one of the documents in the authoritative source, the entity mention including the anchor text, an identifier of the linked-to authoritative document, and a position of the mention within the content of the first document;
  storing the entity mentions in memory;
  repeating the obtaining, determining, identifying, and storing for other documents in the corpus; and
  evaluating a semantic analysis engine using the stored entity mentions and information associated with the documents in the authoritative source.

15. The method of claim 14, wherein entity mentions are identified by matching a token in the anchor text with a token in a title of the linked-to authoritative document.

16. The method of claim 15, wherein entity mentions are further identified by matching a token in the anchor text with an alias for the linked-to authoritative document, the alias being defined by the authoritative source.

17. The method of claim 16, wherein alias is determined by a set of anchor texts within documents from the authoritative source linking to the linked-to authoritative document.

18. The method of claim 14, wherein identifying at least one entity mention includes extracting free text from the first document, so that entity mentions are identified from the free text.

19. The method of claim 14, wherein the semantic analysis engine is an entity matching engine, wherein the anchor text is considered an entity.

20. The method of claim 14, wherein the semantic analysis engine is an entity tagging engine and the method further comprises:
- associating the stored entity mentions with respective entity types based on categories associated with the linked-to authoritative document; and
- evaluating the entity tagging engine using the stored entity mentions and the associated entity types.

21. The method of claim 14, wherein at least one million documents in the corpus includes links to documents in the authoritative source.

* * * * *

UNITED STATES PATENT AND TRADEMARK OFFICE
CERTIFICATE OF CORRECTION

| | | |
|---|---|---|
| PATENT NO. | : 9,224,103 B1 | |
| APPLICATION NO. | : 13/801197 | |
| DATED | : December 29, 2015 | |
| INVENTOR(S) | : Amarnag Subramanya et al. | |

It is certified that error appears in the above-identified patent and that said Letters Patent is hereby corrected as shown below:

On the title page, in item (74), in column 2, in "Attorney, Agent, or Firm", line 1, delete "Bellerman" and insert --Bellermann--, therefor.

Signed and Sealed this
Twenty-third Day of August, 2016

Michelle K. Lee
*Director of the United States Patent and Trademark Office*